March 10, 1964 J. H. HOLLYDAY 3,124,235
THROWER-TYPE CONVEYOR
Filed Dec. 20, 1962

INVENTOR.
JAMES H. HOLLYDAY
BY Joseph A. Brown
ATTORNEY

United States Patent Office 3,124,235
Patented Mar. 10, 1964

3,124,235
THROWER-TYPE CONVEYOR
James H. Hollyday, New Holland, Pa., assignor to Sperry Rand Corporation, New Holland, Pa., a corporation of Delaware
Filed Dec. 20, 1962, Ser. No. 246,239
10 Claims. (Cl. 198—128)

This invention relates to bale throwers of the type having a pair of continuously rotated conveyors engageable respectively with the top and bottom of bales discharged from a baler to traject them to a trailing wagon. More specifically, the invention relates to an improvement in a drive for such a thrower where power is taken from the flywheel of the baler on which the thrower is mounted.

Conventionally, bale throwers of the continuously rotatable conveyor type are driven by a gasoline engine mounted on the thrower. While an engine drive is satisfactory, certain additional advantages are obtained when the baler on which the thrower is mounted is used as a power source for operating the thrower. To keep costs a minimum, a drive has been provided heretofore which picks up power from the baler flywheel and uses sheave and belt means for transmitting the power to the thrower. One problem in driving the thrower from the baler flywheel is that the speed of rotation of the flywheel is non-uniform. This results from the nature of the operation of a hay baler which uses power in surges, a bale forming plunger operating at high speed and in successive compressing and return strokes. A decrease in the amount of power to the thrower at the time a bale is to be thrown will adversely effect the trajectory of the bale. To compensate for power input variations the thrower itself is preferably provided with a flywheel operatively associated with the thrower conveyors. This insures proper throwing action but produces torque forces tending to cause the drive to overrun when the baler flywheel slows down and tending to cause the drive to slip when the baler flywheel speeds up after the thrower has slowed down. Such forces have to be carried by the thrower drive. The stresses increase wear and tear, thereby lessening the overall life of the structure.

A main object of this invention is to provide, in a bale thrower power-take-off drive of the character described, means whereby torque forces produced by a thrower flywheel are compensated for to thereby lessen wear and tear on the drive.

Another object of this invention is to provide, in a bale thrower power-take-off drive of the character described, a simple clutch construction which will permit the thrower to overrun the baler flywheel from which it is driven.

Another object of this invention is to provide a thrower drive structure which includes a clutch which will permit the drive to the thrower to slip only when very large resistance forces are encountered.

Another object of this invention is to provide a simple drive means from a baler flywheel to a thrower and incorporating overrunning and slip features, the torque forces required to slip being many times greater than the torque forces required for overrunning.

A further object of this invention is to provide a power-take-off drive for a bale thrower in which a clutch is operatively related to an endless belt connecting a baler flywheel to a driven sheave, means limiting the operation of the clutch and insuring against the belt becoming disconnected.

A still further object of this invention is to provide a low cost power-take-off drive arrangement which achieves the foregoing objects without materially adding to the overall cost of the drive.

Other objects of this invention will be apparent hereinafter from the specification and from the recital in the appended claims.

Figure 1:
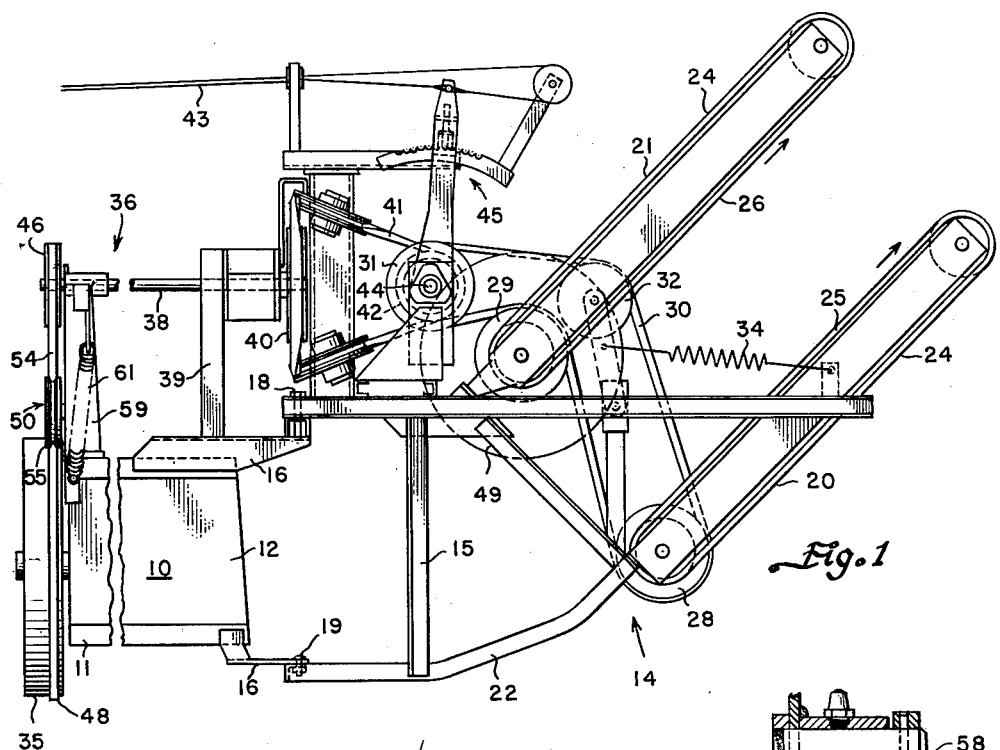
FIG. 1 is a fragmentary side elevation of a bale thrower powered by a connection to the flywheel of the baler on which the thrower is mounted, the drive incorporating overrunning and slip clutch means constructed according to this invention.

Referring now to the drawing by numerals of reference, and particularly to FIG. 1, 10 denotes the bale case of a conventional hay baler. The bale case extends in a fore-and-aft direction relative to the travel of the baler and it has a forward end 11 and a rearward discharge end 12. As the baler operates, hay bales are successively delivered from discharge end 12. For receiving the bales and trajecting them automatically to a trailing wagon, a bale thrower 14 is provided. The thrower comprises a frame structure 15 connected to the baler by brackets 16 fastened to the top and bottom of the bale case. The connection includes vertically aligned pivots 18 and 19 which provide a vertical axis about which the thrower 14 is laterally swingable. In this way, the direction in which the bales are trajected may be varied as desired so that a bale will be deposited in the wagon trailing behind the baler regardless of the operative position of the baler and the wagon.

For trajecting each bale, thrower 14 has a pair of cooperative rotatable conveyors, namely lower conveyor 20 and upper conveyor 21. These conveyors are coextensive and they are inclined in an upward rearward direction as shown. Each bale discharged from the bale case 10 is received on a platform 22 which guides each bale toward conveyors 20 and 21. The lower conveyor 20 engages the bottom of each bale while the upper conveyor 21 engages the top. When viewed as shown in FIG. 1, lower conveyor 20 rotates continuously in a clockwise direction while the upper conveyor 21 rotates continuously counterclockwise. Each conveyor is provided with an endless belt 24, the upper reach 25 of the lower conveyor and the lower reach 26 of the upper conveyor both travelling rearwardly. The respective belts 24 each have a friction surface which engages the bale and slides relative thereto until sufficient force is applied to the bale to traject it.

Lower conveyor 20 has a power driven sheave 28 and the upper conveyor 21 has a power driven sheave 29. These sheaves are driven by a common endless belt 30 driven from a sheave 31. Belt 30 is maintained in a tight driving position by an idler 32 spring biased towards belt tightening position by a spring 34.

At the forward end 11 of bale case 10, a large diameter flywheel 35 is rotatably mounted. For driving the bale thrower 14, a power train 36 is provided from flywheel 35 to sheave 31. This power train comprises a fore-and-aft extending drive shaft 38 rotatably supported on standards 39 and 59. At its rearward end, shaft 38 carries a sheave 40 which operates through a belt 41 to transmit power to a sheave 42 rotatably supported on thrower frame 15. Sheaves 31 and 42 are rotatably supported on a common shaft 44 and both of these sheaves comprise split sheaves whereby a variable speed may be provided to the thrower. The operation of the split sheaves is responsive to the position of the shaft 44 which is adjustable in a fore-and-aft direction by a ratchet mechanism 45 controlled by cables 43. The speed control means is not described in detail here since it comprises no part of the present invention.

At its forward end, shaft 38 carries a driven sheave 46 directly connected to the baler flywheel 35 by an endless belt 48. On rotation of flywheel 35, belt 48 is driven to drive the driven sheave 46 which in turn rotates the drive shaft 38 to transmit power through sheaves 40, 44 and 31 to the endless belt 30 for operating the thrower conveyors 20 and 21. Flywheel 35 is part of the drive to the baler. When the baler is driven by the tractor which tows it, the drive to the baler is 540 r.p.m. As bales are formed in the baler, the baler plunger, not shown, operates in successive compression and return strokes. The non-uniform consumption of power in the baler, produces a non-uniform speed of rotation of the flywheel 35.

Since the output of power from the flywheel 35 is non-uniform and power is used in relatively large amounts for short intervals, a flywheel 49 is provided for the thrower. As shown in FIG. 1, flywheel 49 is co-axial with the drive sheave 29 for the upper conveyor 21 of the thrower. The flywheel operates directly to upper conveyor 21 and through belt 30 to transmit the flywheel forces to lower conveyor 21. Because of flywheel 49, power input variations to the thrower are minimized and the trajecting force of the bale thrower 14 is more uniform. However, flywheel 49 develops overrunning torque forces which are transmitted through shaft 38 to the driven sheave 46 when the baler flywheel 35 slows down. In like respect, when flywheel 35 speeds up after slowing down, flywheel 49 transmits slip forces through shaft 38 when the speed of the thrower is lower than the driving speed of sheave 46. To compensate for such forces, overrunning and slip clutch means 50 is provided and interposed in the drive between flywheel 35 and the bale thrower.

Figures 2, 3, 4:
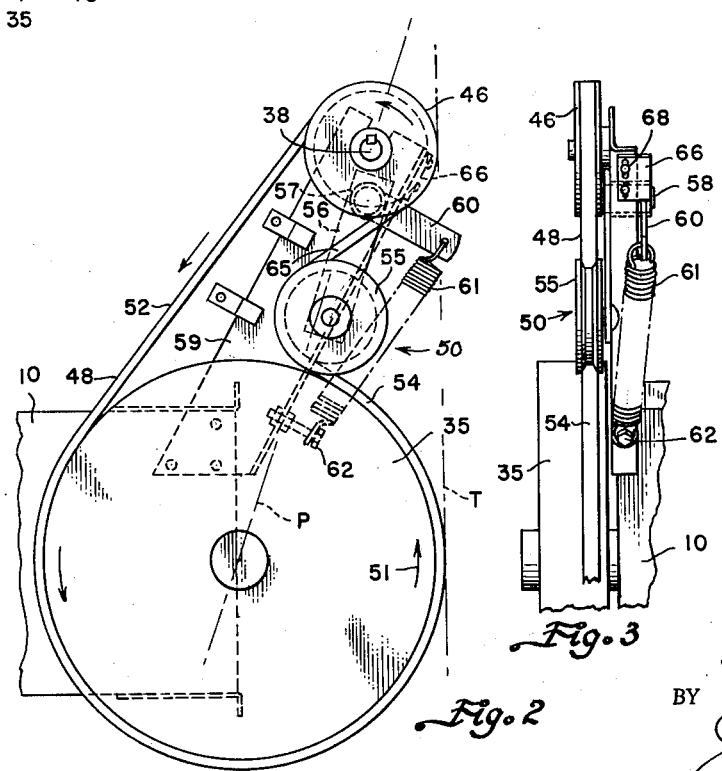
FIG. 2 is an enlarged front view looking from left to right in FIG. 1 and showing the baler flywheel, the sheave driven therefrom and the means permitting the drive to overrun and slip.
FIG. 3 is an enlarged side elevation of the upper portion FIG. 2 looking from right to left.
FIG. 4 is an enlarged section showing the idler mounting means of this invention.

As shown best in FIG. 2, flywheel 35 rotates in a counterclockwise direction as indicated by the arrows 51. The endless belt 48 has a power side 52 and a slack side 54. The overall length of endless belt 48 is substantially greater than that required merely to connect flywheel 35 to driven sheave 46. A substantial amount of slack is provided in the slack side 54 of the belt and such slack is taken up by the slip and overrunning clutch means 50. Such means comprises an idler or wheel 55 carried on one arm 56 of a bell crank 57 pivotally supported on pin 58 carried on support 59 which is fastened to bale case 10 and extends upwardly therefrom. The other arm 60 of bell crank 57 has a spring 61 connected to it and the opposite end of the spring is connected to a bolt 62 fastened to support 59. Spring 61 is a relatively light tension spring which biases idler 55 in a direction toward the slack side 54 of endless belt 48.

If idler 55 moved away from its normal position (FIG. 2) an excessive distance, belt 48 might jump off of the idler and disconnect the drive. To prevent this, the outward movement of idler 55 is limited by stop plate 66 with which arm 60 is engageable when bell crank 57 pivots in a counterclockwise direction when viewed as shown in FIG. 2. As shown in FIG. 3, plate 66 is adjustably fastened in place by bolt and slot means 68 whereby the point at which idler 55 is stopped is variable.

In normal operating position, the idler 55 is located as shown in FIG. 2, between flywheel 35 and the driven sheave 46. A plane P through the rotational axis of the flywheel and the axis of driven sheave 46 passes across the idler. Further, idler 55 is located inside of tangent line T, from the periphery of flywheel 35 to the periphery of driven sheave 46. Even when the idler is pivoted outwardly on bell crank 56, stop 66 prevents the idler from crossing tangent line T or at least prevents any substantial portion from crossing. This shows the substantial degree of projection of the idler between the flywheel and driven sheave. The location of the idler substantially increases the amount of belt wrap around the flywheel 35 and also around driven sheave 46. As shown, idler 55 is mounted close to the periphery of flywheel 35 to produce as great a possible wrap on the flywheel as can be achieved. It will be noted that the degree of wrap of the slack side 54 of endless belt 48 around idler wheel 55 is in the vicinity of ninety degrees or more. This produces overrunning and slip clutch results which are not achieved by merely having an idler wheel tightly pressed against a belt to pick up some slack but where the drive around the idler wheel is only a small number of degrees.

When the baler flywheel 35 slows down in its speed of rotation, and there is a tendency for the thrower flywheel 49 to rotate the driven sheave 46 at a faster speed than the drive, such torque forces are transmitted from the driven sheave through the portion 65 of the slack side 54 of the endless belt 48. This pulling force causes idler 55 to swing away from the endless belt and against the resistance of the light spring 61. In the structural arrangement shown, the torque force required to cause idler 55 to swing outwardly is only about two and one half foot pounds. Thus, the overrunning torque forces of the thrower are readily compensated for and sheave 46 overruns the drive.

When the speed of the thrower has been reduced and then flywheel 35 speeds up, there is a tendency for the drive to the thrower to slip. However, such slip is permitted only when the forces are extensive. Slip is substantially prevented by the drive shown and provided by the amount of wrap of endless belt 48 around driven sheave 46 and flywheel 35. This substantial wrap is provided by the location of idler 35. The torque force required for the drive to slip is in the range of twenty-four foot pounds or over ten times the amount of force required for overrunning. Thus, the negative forces which tend to impair the operation of the thrower are very readily eliminated through the small amount of force to produce an overrunning of the thrower. However, the structure resists slipping whereby the positive torque power transmission forces are not lost, being relieved only when the slip forces exceed a very substantial amount. Thus, with this drive arrangement, the desirable positive forces are substantially maintained while the undesirable negative forces are substantially eliminated.

Although the idler wheel 55 serves for belt tightening purposes, its mounting and location provides it with functional characteristics which are not present with an ordinary belt tightening idler. The structure provided involves no material increase in cost over the structural elements ordinarily required. The overall length of the endless belt 48 is greater than would ordinarily be required. However, the additional length involves only a very small cost and the overrunning and slip clutch features provided by the idler 55 very materially improve the operation of the drive to the thrower. The substantial advantages in the operation of the thrower 14 provided by the thrower flywheel 49 are fully utilized while the disadvantages of the thrower flywheel 49 in subjecting the drive train 36 to variable forces and stresses are eliminated. The cost of the drive structure is low and commensurate with the gasoline engine which the drive replaces. All of the belts, sheaves and other drive components of the structure have long, operative and maintenance free life.

While this invention has been described in connection with a particular embodiment thereof, it will be understood that it is capable of modification, and this application is intended to cover any variation, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A hay baler having a fore-and-aft extending bale case, a bale thrower mounted on a rear end of said bale case to receive bales therefrom and having a pair of rotatable conveyors engageable respectively with opposite sides of the bales to traject them away from the baler, a flywheel on said thrower and operatively connected to said pair of conveyors, a fore-and-aft extending drive shaft rotatably supported on said bale case, means connecting a rearward end of said shaft to said thrower to operate said pair of conveyors, a flywheel rotatably mounted on a forward portion of said baler and through which the baler is operated, said baler flywheel being rotatable about an axis parallel to said drive shaft, a driven sheave mounted on a forward end of said drive shaft, the diameter of said driven sheave being substantially smaller than the diameter of said baler flywheel, an endless belt extending around said baler flywheel and said driven sheave to transmit power from the baler flywheel to said drive shaft and through the shaft to said thrower, said endless belt having a power side and a slack side, the speed of rotation of said baler flywheel being non-uniform responsive to a non-uniform consumption of power by the baler and the thrower flywheel transmitting torque forces through said drive shaft to said driven sheave tending to cause the sheave to overrun the drive when the baler flywheel slows down and resisting a drive to the sheave when the baler flywheel speeds up after the drive shaft has slowed down, and means operatively associated with said endless belt to permit said driven sheave to overrun said baler flywheel when certain overrunning torque forces are present and to allow the belt to slip relative to the sheave when certain slip torque forces are present, said overrun and slip means comprising an idler engaging said slack side of said endless belt, means mounting said idler for shiftable movement in a direction toward and away from said endless belt, the slackness of said slack side being very substantial and said idler normally projecting between said baler flywheel and said driven sheave such an extent that a plane through the axis of the baler flywheel and the driven sheave crosses the idler, and spring means biasing said idler toward said belt.

2. A hay baler having a fore-and-aft extending bale case, a bale thrower mounted on a rear end of said bale case to receive bales therefrom and having a pair of rotatable conveyors engageable respectively with opposite sides of the bales to traject them away from the baler, a flywheel on said thrower and operatively connected to said pair of conveyors, a fore-and-aft extending drive shaft rotatably supported on said bale case, means connecting a rearward end of said shaft to said thrower to operate said pair of conveyors, a flywheel rotatably mounted on a forward portion of said baler and through which the baler is operated, said baler flywheel being rotatable about an axis parallel to said drive shaft, a driven sheave mounted on a forward end of said drive shaft, the diameter of said driven sheave being substantially smaller than the diameter of said baler flywheel, an endless belt extending around said baler flywheel and said driven sheave to transmit power from the baler flywheel to said drive shaft and through the shaft to said thrower, said endless belt having a power side and a slack side, the speed of rotation of said baler flywheel being non-uniform responsive to a non-uniform consumption of power by the baler and the thrower flywheel transmitting torque forces through said drive shaft to said driven sheave tending to cause the sheave to overrun the drive when the baler flywheel slows down and resisting a drive to the sheave when the baler flywheel speeds up after the drive shaft has slowed down, and means operatively associated with said endless belt to permit said driven sheave to overrun said baler flywheel when certain overrunning torque forces are present and to allow the belt to slip relative to the sheave when certain slip torque forces are present, said overrun and slip means comprising an idler engaging said slack side of said endless belt, means mounting said idler for shiftable movement in a direction toward and away from said endless belt, the slackness of said slack side being very substantial and said idler normally projecting between said baler flywheel and said driven sheave such an extent that a tangent line from the periphery of the baler flywheel to the periphery of said driven sheave is outside said idler even when the idler has shifted from normal position.

3. A hay baler having a fore-and-aft extending bale case, a bale thrower mounted on a rear end of said bale case to receive bales therefrom and having a pair of rotatable conveyors engageable respectively with opposite sides of the bales to traject them away from the baler, a flywheel on said thrower and operatively connected to said pair of conveyors, a fore-and-aft extending drive shaft rotatably supported on said bale case, means connecting a rearward end of said shaft to said thrower to operate said pair of conveyors, a flywheel rotatably mounted on a forward portion of said baler and through which the baler is operated, said baler flywheel being rotatable about an axis parallel to said drive shaft, a driven sheave mounted on a forward end of said drive shaft, the diameter of said driven sheave being substantially smaller than the diameter of said baler flywheel, an endless belt extending around said baler flywheel and said driven sheave to transmit power from the baler flywheel to said drive shaft and through the shaft to said thrower, said endless belt having a power side and a slack side, the speed of rotation of said baler flywheel being non-uniform responsive to a non-uniform consumption of power by the baler and the thrower flywheel transmitting torque forces through said drive shaft to said driven sheave tending to cause the sheave to overrun the drive when the baler flywheel slows down and resisting a drive to the sheave when the baler flywheel speeds up after the drive shaft has slowed down, and means operatively associated with said endless belt to permit said driven sheave to overrun said baler flywheel when certain overrunning torque forces are present and to allow the belt to slip relative to the sheave when certain slip torque forces are present, said overrun and slip means comprising an idler engaging said slack side of said endless belt, means mounting said idler for shiftable movement in a direction toward and away from said endless belt, the slackness of said slack side being substantial and said idler normally projecting between said baler flywheel and said driven sheave such an extent that the degree of wrap of said endless belt around said idler is in the vicinity of ninety degrees and more, and spring means biasing said idler toward said belt.

4. A hay baler as recited in claim 3 wherein stop means is provided limiting movement of said idler in a direction away from said endless belt, and means for adjusting the location of said stop means.

5. A hay baler as recited in claim 3 wherein said idler is supported in a location closer to said baler flywheel than to said driven sheave.

6. A hay baler as recited in claim 3 wherein said idler is carried on one arm of a bell crank pivotally supported on said bale case, and said spring means being a tension spring connected between the other bell crank arm and the bale case and tending to pivot said one arm and thus the idler toward the endless belt.

7. A hay baler having a fore-and-aft extending bale case, a bale thrower mounted on a rear end of said bale case to receive bales therefrom and having a pair of rotatable conveyors engageable respectively with opposite sides of the bales to traject them away from the baler, a flywheel on said thrower and operatively connected to said pair of conveyors, a fore-and-aft extending drive shaft rotatably supported on said bale case, means connecting a rearward end of said shaft to said thrower to operate said pair of conveyors, a flywheel rotatably mounted on a forward portion of said baler and through which the baler is operated, said baler flywheel being rotatable about an axis parallel to said drive shaft, a driven sheave mounted on a forward end of said drive shaft, an endless belt extending around said baler flywheel and said driven sheave to transmit power from the baler flywheel to said drive shaft and through the shaft to said thrower, said endless belt having a power side and a slack side, the speed of rotation of said baler flywheel being non-uniform responsive to a non-uniform consumption of power by the baler and the thrower flywheel transmitting torque forces through said drive shaft to said driven sheave tending to cause the sheave to overrun the drive when the baler flywheel slows down and resisting a drive to the sheave when the baler flywheel speeds up after the drive shaft has slowed down, and means operatively associated with said endless belt to permit said driven sheave to overrun said baler flywheel when certain overrunning torque forces are present and to allow the belt to slip relative to the sheave when certain slip torque forces are present.

8. A hay baler having a fore-and-aft extending bale case, a bale thrower mounted on a rear end of said bale case to receive bales therefrom and having a pair of rotatable conveyors engageable respectively with opposite sides of the blades to traject them away from the baler, a flywheel on said thrower and operatively connected to said pair of conveyors, a fore-and-aft extending drive shaft rotatably supported on said bale case, means connecting a rearward end of said shaft to said thrower to operate said pair of conveyors, a flywheel rotatably mounted on a forward portion of said baler and through which the baler is operated, said baler flywheel being rotatable about an axis parallel to said drive shaft, a driven sheave mounted on a forward end of said drive shaft, the diameter of said driven sheave being substantially smaller than the diameter of said baler flywheel, an endless belt extending around said baler flywheel and said driven sheave to transmit power from the baler flywheel to said drive shaft and through the shaft to said thrower, said endless belt having a power side and a slack side, the speed of rotation of said baler flywheel being non-uniform responsive to a non-uniform consumption of power by the baler and the thrower flywheel transmitting torque forces through the drive shaft to said driven sheave tending to cause the sheave to overrun the drive when the baler flywheel slows down and resisting a drive to the sheave when the baler flywheel speeds up after the drive shaft has slowed down, and means operatively associated with said endless belt to permit said driven sheave to overrun said baler flywheel when certain overrunning torque forces are present and to allow the belt to slip relative to the sheave when certain slip torque forces are present, the forces required to cause said drive to slip being a plural number of times greater than the forces required to allow the driven sheave to overrun.

9. A hay baler having a fore-and-aft extending bale case, a bale thrower mounted on a rear end of said bale case to receive bales therefrom and having rotatable conveying means for trajecting the bales from the baler, a flywheel on said bale thrower and operatively connected to said conveying means, a flywheel rotatably mounted on a forward portion of said baler and through which the baler is operated, a power train connecting said baler flywheel to said thrower to thereby drive the thrower, the speed of rotation of the baler flywheel being non-uniform and the thrower flywheel tending to cause said power train to overrun the drive when the baler flywheel slows down and resisting a drive to the drive train when the baler flywheel speeds up after the drive train has slowed down, and means incorporated into said power train to allow the drive from the flywheel to the thrower to slip when encountering resisting torque forces exceeding a given amount and allowing the thrower to overrun the drive when there are drag forces on the thrower exceeding a given amount, the torque forces required for the drive to slip being a plural number of times greater than the forces required for the drive to overrun.

10. A hay baler having a fore-and-aft extending bale case, a bale thrower mounted on a rear end of said bale case to receive bales therefrom and having rotatable conveying means for trajecting the bales from the baler, a flywheel on said bale thrower and operatively connected to said conveying means, a flywheel rotatably mounted on a forward portion of said baler and through which the baler is operated, a power train connecting said baler flywheel to said thrower to thereby drive the thrower, the speed of rotation of the baler flywheel being non-uniform and the thrower flywheel tending to cause said power train to overrun the drive when the baler flywheel slows down, and overrunning clutch means incorporated into said power train to allow said power train to overrun.

References Cited in the file of this patent
UNITED STATES PATENTS
3,095,962     Hollyday _____ July 2, 1963